Feb. 8, 1966 J. D. PEARSON 3,234,477
PARAMETRIC AMPLIFIERS WITH SYMMETRICALLY
LOCATED DIODE LOOP FOR IDLER CIRCUIT
Filed March 11, 1964

Inventor
J. D. PEARSON
By
Cameron, Kerkam & Sutton
Attorneys 3,234,477
Patented Feb. 8, 1966

3,234,477

PARAMETRIC AMPLIFIERS WITH SYMMETRICALLY LOCATED DIODE LOOP FOR IDLER CIRCUIT

John Derek Pearson, Droylsden, Manchester, England, assignor to Ferranti, Limited, Hollinwood, Lancashire, England, a company of Great Britain and Northern Ireland Filed Mar. 11, 1964, Ser. No. 351,084
Claims priority, application Great Britain, Mar. 13, 1963, 9,931/63
8 Claims. (Cl. 330—4.9)

This invention relates to parametric amplifiers.

Parametric amplifiers are known in which signal energy in a given frequency band is mixed with pump energy by means of a variable capacity diode to produce energy at a frequency, known as the idler frequency, which in turn mixes with the pump energy to produce an amplified output signal at the same frequency as the input signal. To obtain a minimum noise figure with such amplifiers it is necessary that the electrical losses at the idler frequency are restricted to the inherent ohmic loss in the diode element itself and it is therefore usual to include filters to prevent dissipation of the idler energy in the signal and pump circuits. The filters, however, store electromagnetic energy and reduce the bandwidth of the idler circuit and may also reduce the bandwidth of the signal and pump circuits.

It is an object of the present invention to provide a parametric amplifier in which dissipation of the idler energy in the signal and pump circuits is prevented without the use of filters.

According to the present invention a parametric amplifier includes an electromagnetic wave transmission path adapted to receive energy from a pump source, a pair of matched variable capacitance semiconductor diodes closely spaced and connected in parallel but with reverse polarity and connected to said transmission path such that the voltages developed across said diodes due to said pump source are equal in magnitude and phase, and means for connecting a source of signal energy to said diodes such that the voltages developed across said diodes due to said signal source are equal in magnitude and phase.

Said transmission path may be a waveguide and said means for connecting a source of signal energy to said waveguide may comprise a further waveguide or a coaxial transmission line.

Said pair of matched diodes may comprise two like semiconductor diodes or may comprise a first semiconductor diode and a second semiconductor diode in which the semiconductor element is of reverse polarity material to that of said first diode.

Figure 1:
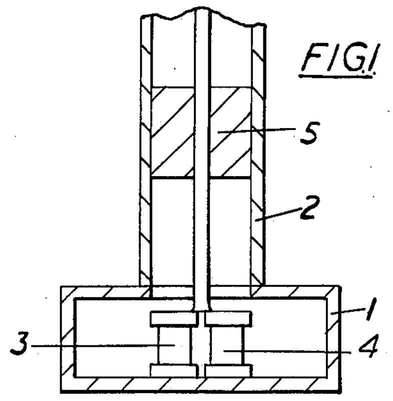
Figure 2:
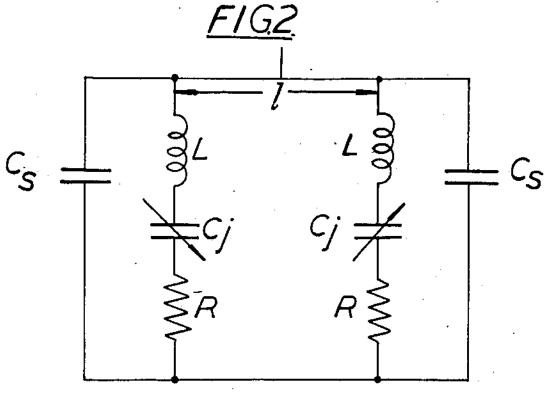
Figure 3:
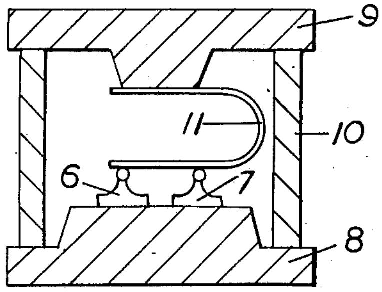

The present invention will now be described by way of example with reference to the accompanying drawings in which:

FIGURE 1 is a sectional elevation of a parametric amplifier in accordance with the invention, FIGURE 2 is a circuit diagram showing the equivalent circuit of the pair of diodes shown in FIGURE 1, and FIGURE 3 is a sectional elevation of a pair of diodes mounted in a single enclosure.

Referring now to FIGURE 1 of the drawings, the parametric amplifier shown includes a waveguide 1 connected to a coaxial transmission line 2. A pair of matched variable capacitance semiconductor diodes 3, 4 are mounted within the waveguide 1 such that they are closely spaced and physically aligned transversely in the centre of the waveguide 1. The diodes 3, 4 each have one end connected to the waveguide 1 and one end connected to the inner conductor of the coaxial line 2 such that they are electrically connected in parallel but with reverse polarity.

The waveguide 1 is connected to a source of pump energy (not shown) and is dimensioned such that the pump energy is propagated along the guide in the $H_{01}$ mode. The coaxial line 2 is connected to a source of signal energy (not shown) and includes in this example a slug 5 for adjusting the impedance of the line 2 at the signal frequency.

The equivalent circuit of the diodes 3, 4 is shown in FIGURE 2 from which it will be seen that each diode may be considered as a series resonant circuit comprising an inductance L, the variable junction capacitance $C_j$ and a resistance R, shunted by the stray capacitance $C_s$, the reverse polarities of the diodes 3, 4 being indicated by the arrows through the junction capacitances $C_j$. In the parametric amplifier in accordance with the present invention the resonant circuit formed by the parallel connection of the diodes 3, 4 is used as the idler circuit, the frequency of which is dependent upon the inductance associated with the length $l$ of metal joining the two diodes.

In operation the frequency of the pump energy is made equal to the sum of the signal frequency and the resonant frequency of the idler circuit formed by the diodes 3, 4. Due to the physical arrangement of the diodes 3, 4 the pump voltages developed across the diodes are equal in magnitude and phase and, similarly, the signal voltages developed across the diodes are equal in magnitude and phase. Parametric amplification of the signal is achieved in normal manner by resonance in the idler circuit, but due to the reverse polarity of the diodes 3, 4 the idler voltages developed across the diodes are opposite in phase and such a voltage configuration is unable to propagate along the waveguide 1 or the coaxial line 2 and the idler energy is therefore excluded from the pump and signal circuits without the use of filters.

The diodes 3, 4 may comprise diodes in which the semiconductor element of one is of reverse polarity material to that of the other. Alternatively the two diodes 3, 4 may be like diodes connected with reverse polarity.

As previously stated, the resonant frequency of the idler circuit formed by the two diodes connected in parallel is dependent on the length $l$ of metal joining the two diodes. To obtain a high resonant frequency the two diodes may be mounted in a single enclosure as shown in FIGURE 3 in which two matched variable capacitance semiconductor elements 6, 7 are mounted on one end terminal 8 which is separated from the other end terminal 9 by a ceramic cylinder 10. The elements 6 and 7 are of reverse polarity matreial, i.e. the element 6 has a P-type junction formed on an N-type slice and the element 7 has an N-type junction formed on a P-type slice, the slices being soldered to the terminal 8. The terminal 9 is connected to the elements 6 and 7 by a resilient metallic strip 11 and in this manner the length $l$ of metal joining the two diodes is reduced to a minimum.

Although in the embodiment described above the pump source has been shown as being connected to the amplifier via a waveguide, the pump source may be connected to the amplifier via any other suitable kind of electromagnetic wave transmission path such as a coaxial transmission line. Similarly, the signal source may be connected to the amplifier via any other suitable electromagnetic wave transmission path, such as a waveguide, instead of via a coaxial transmission line as described above.

What I claim is:

1. A parametric amplifier including an electromagnetic wave transmission path adapted to receive energy from a pump source, a pair of matched variable capacitance semiconductor diodes closely spaced and connected in parallel but with reverse polarity to form an idler circuit and connected to said transmission path transverse to the direction of propagation of energy along said transmission path so that the voltages developed across said diodes due to said pump source are equal in magnitude and phase, and means for so connecting a source of signal energy to said diodes that the voltages developed across said diodes due to said signal source are equal in magnitude and phase.

2. A parametric amplifier as claimed in claim 1 in which said transmission path is a waveguide and said diodes are symmetrically disposed transversely with respect to the waveguide.

3. A parametric amplifier as claimed in claim 1 in which said means for connecting a source of signal energy comprises a waveguide.

4. A parametric amplifier as claimed in claim 1 in which said means for connecting a source of signal energy comprises a coaxial transmission line.

5. A parametric amplifier as claimed in claim 1 in which said pair of matched diodes comprise two like semiconductor diodes.

6. A parametric amplifier as claimed in claim 1 in which said pair of matched diodes comprises a first semiconductor diode and a second semiconductor diode in which the semiconductor element is of reverse polarity material to that of said first diode.

7. A parametric amplifier as claimed in claim 1 in which said pair of matched diodes are mounted in a single enclosure.

8. A parametric amplifier as claimed in claim 2 in which said waveguide is of rectangular cross-section and said pair of matched diodes are so mounted within said waveguide that they are physically aligned closely adjacent the centre line of one of the broader faces of said waveguide.

References Cited by the Examiner

Hayasi et al., "IRE Transactions on Microwave Theory and Techniques," May 1962, pages 185–190.

ROY LAKE, *Primary Examiner*.